United States Patent
Katsumata et al.

(10) Patent No.: US 6,855,187 B2
(45) Date of Patent: Feb. 15, 2005

(54) METHOD FOR RECYCLING WASTE WIRE HARNESS

(75) Inventors: Makoto Katsumata, Susono (JP); Hiroshi Suzuki, Susono (JP)

(73) Assignee: Yazaki Corporation, Tokyo (JP)

(*) Notice: Subject to any disclaimer, the term of this patent is extended or adjusted under 35 U.S.C. 154(b) by 210 days.

(21) Appl. No.: 10/304,997

(22) Filed: Nov. 27, 2002

(65) Prior Publication Data

US 2003/0115989 A1 Jun. 26, 2003

(30) Foreign Application Priority Data

Nov. 27, 2001 (JP) .................................. P2001-360918

(51) Int. Cl.⁷ .............................................. C22B 7/00
(52) U.S. Cl. ....................................... 75/403; 423/636
(58) Field of Search ............................. 75/403; 423/636

(56) References Cited

U.S. PATENT DOCUMENTS 3,777,679 A * 12/1973 Przewalski .................... 75/403
4,362,276 A   12/1982 Morey

FOREIGN PATENT DOCUMENTS

JP    2002-313164 A    10/2002
WO    WO 98/10432 A1   3/1998

OTHER PUBLICATIONS

Japanese Abstract No. 09198921, dated Jul. 31, 1997.
Database WPI Section Ch, Week 199615 Derwent Publications Ltd., London, GB: AN1996-148489 XP002275267 & JP 08 036916 A (abstract) dated Feb. 6, 1996.
Japanese Abstract No. 2002313164, dated Oct. 25, 2002.
Kohnlechner R., "Copper Separation from Cable Scrap Ecological Recycling of Cable Scrap", Physics Today, American Institute of Physics. New York, US, vol. 61, No. 5, May 1, 1994, pp. 342–343, XP000442546.

* cited by examiner

*Primary Examiner*—Melvyn Andrews
(74) *Attorney, Agent, or Firm*—Sughrue Mion, PLLC

(57) ABSTRACT

In a waste wire harness including electric wires each coated with a resin comprised of an olefin-based resin and magnesium hydroxide as a fire retardant, and including accompanied members having at least one of terminals, connectors, various kind of boxes such as junction boxes and fuse boxes, tapes, tubes, grommets, wiring clips, and protectors, a method for recycling the waste wire harness includes a step of removing the accompanied members from the waste wire harness, a step of crushing the waste wire harness after removing the accompanied members to obtain crushed particles, a step of incinerating the crushed particles to produce incinerated ash, a step of converting a magnesium compound contained in the incinerated ash into magnesium hydroxide, and a step of collecting the magnesium hydroxide.

5 Claims, 5 Drawing Sheets

METHOD FOR RECYCLING WASTE WIRE HARNESS

BACKGROUND OF THE INVENTION

The invention relates to a method for recycling a waste wire harness constituted by electric wires each coated with a resin composition containing an olefin-based resin and magnesium hydroxide mixed as a fire retardant with the olefin-based resin.

Wire harness has been used popularly as an electric wiring system in a vehicle or another apparatus such as a household electrical appliance, a business machine or an information machine. Heretofore, electric wires each using a vinyl chloride resin as an electrical insulator or as a coating material such as a sheath became the mainstream of electric wires constituting the wire harness. However, the vinyl chloride resin generates a harmful hydrogen chloride gas which has a bad influence on human bodies and causes a corrosion of the apparatus when the vinyl chloride resin burns. Hence, a so-called non-halogen or low-halogen fire-retardant resin composition containing an olefin-based resin and magnesium hydroxide mixed as a fire retardant with the olefin-based resin has begun to be used popularly as an electrical insulator or a coating material such as a sheath of each electric wire in recent years. With the advance of popularization of the so-called non-halogen or low-halogen fire-retardant resin composition, a wire harness constituted by braided electric wires each using the so-called non-halogen or low-halogen fire-retardant resin composition as an electrical insulator or a coating material such as a sheath has begun to be used popularly.

On the other hand, as a method for recycling waste of a wire harness constituted by electric wires each using a vinyl chloride resin as a coating material (hereinafter also referred to as "vinyl chloride-coated wire harness"), JP-A-2002-313164 discloses a related-art method having the steps of: crushing the waste vinyl chloride-coated wire harness to obtain crushed particles; sorting the crushed particles into crushed iron particles, crushed copper and copper alloy particles and crushed resin particles; processing the crushed iron particles as scrap ion; reclaiming the crushed copper and copper alloy particles as copper; and landfilling and conserving the crushed resin particles as industrial waste. The crushed resin particles may be dechlorinated so that they can be used as a reducing agent in place of coke in an iron-making blast furnace.

There has been never proposed any efficient recycling method which is applied to a wire harness constituted by electric wires each using a non-halogen or low-halogen fire retardant resin composition as a coating material, that is, a wire harness foreseen well to become the mainstream in the future and by which magnesium hydroxide as a fire retardant can be collected and reused. Generally, 100 parts by weight of polyolefin-based resin contain about 50 to 200 parts by weight of magnesium hydroxide. If magnesium hydroxide can be collected and reused efficiently, the material cost of electric wires can be reduced greatly.

In addition, in the existing circumstances, waste members such as connectors and junction boxes accompanying the electric wires of the wire harness are generally processed by a method of crushing and landfilling the waste members. No effective method for recycling the waste members has ever been established.

SUMMARY OF THE INVENTION

It is therefore an object of the present invention to provide a method for recycling a waste wire harness, in which magnesium hydroxide as a fire retardant can be also efficiently collected and reuse, and in which waste members accompanying the electric wires can be reused.

In order to achieve the above object, according to the present invention, there is provided a method for recycling a waste wire harness including electric wires each coated with a resin comprised of an olefin-based resin and magnesium hydroxide as a fire retardant, and including accompanied members having at least one of terminals, connectors, various kind of boxes such as junction boxes and fuse boxes, grommets, wiring clips, and protectors which are connected to the electric wires, comprising the steps of:

crushing the waste wire harness after removing the accompanied members to obtain crushed particles;

incinerating the crushed particles to produce incinerated ash;

converting a magnesium compound contained in the incinerated ash into magnesium hydroxide; and collecting the magnesium hydroxide.

Preferably, the method for recycling a waste wire harness further comprising the step of sorting the crushed particles obtained in the crushing step into crushed metal particles and crushed resin particles so that only the crushed resin particles are incinerated in the incinerating step.

Here, it is preferable that, the method for recycling a waste wire harness further comprising the step of reclaiming and collecting metal from the crushed metal particles sorted in the sorting step.

Preferably, the method for recycling a waste wire harness further comprising the step of removing the accompanied members from the waste wire harness before the crushing step.

Here, it is preferable that, the method for recycling a waste wire harness further comprising the steps of selectively taking resin parts from the accompanied members removed in the removing step;

crushing the resin parts to obtain crushed resin particles; and mixing the crushed resin particles with a molding material to obtain a molded article.

In the above method, magnesium hydroxide mixed as a fire retardant can be also collected and reused, and a method for recycling waste of the wire harness in which waste members accessory to the electric wires can be reused.

According to the present invention, there is also provided a method for recycling a waste wire harness including electric wires each coated with a resin comprised of an olefin-based resin and magnesium hydroxide as a fire retardant, and including accompanied members having at least one of terminals, connectors, various kind of boxes such as junction boxes and fuse boxes, grommets, wiring clips, and protectors which are connected to the electric wires, comprising the steps of:

removing the accompanied members except olefin-based resin members from the waste wire harness;

crushing the wire harness after removing the accompanied members except olefin-based resin members to obtain crushed particles;

sorting the crushed particles into crushed metal particles and crushed resin particles;

preparing a molding material containing the crushed resin particles; and molding the molding material to obtain a fire-retardant molded article.

Preferably, the method for recycling a waste wire harness further comprising the step of reclaiming and collecting metal from the crushed metal particles sorted in the sorting step.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A method for recycling a waste wire harness according to the invention will be described below in detail with reference to the drawings.

(First Recycling Method)

Figure 1:
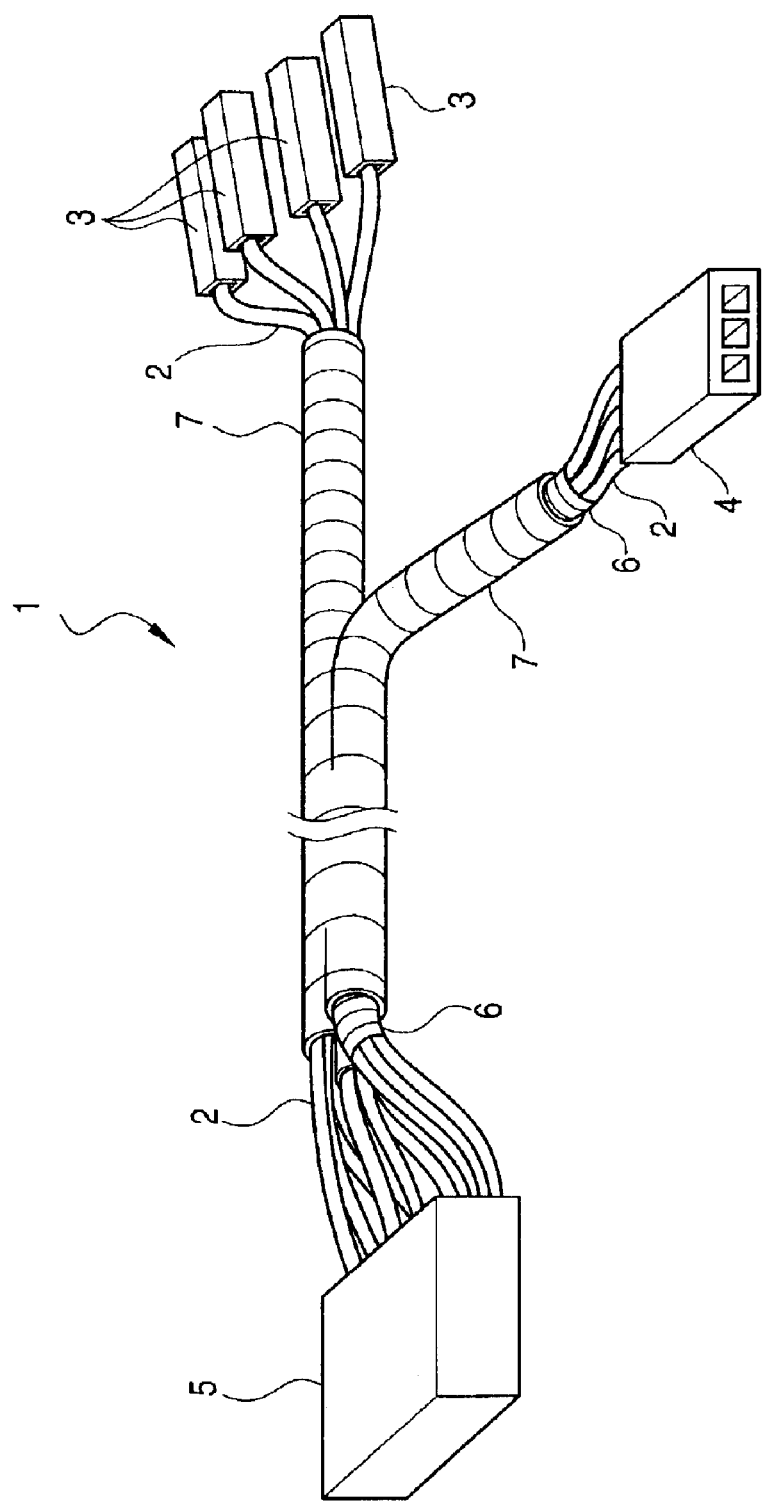
FIG. 1 is a perspective view showing an example of wire harness.
Figure 2:
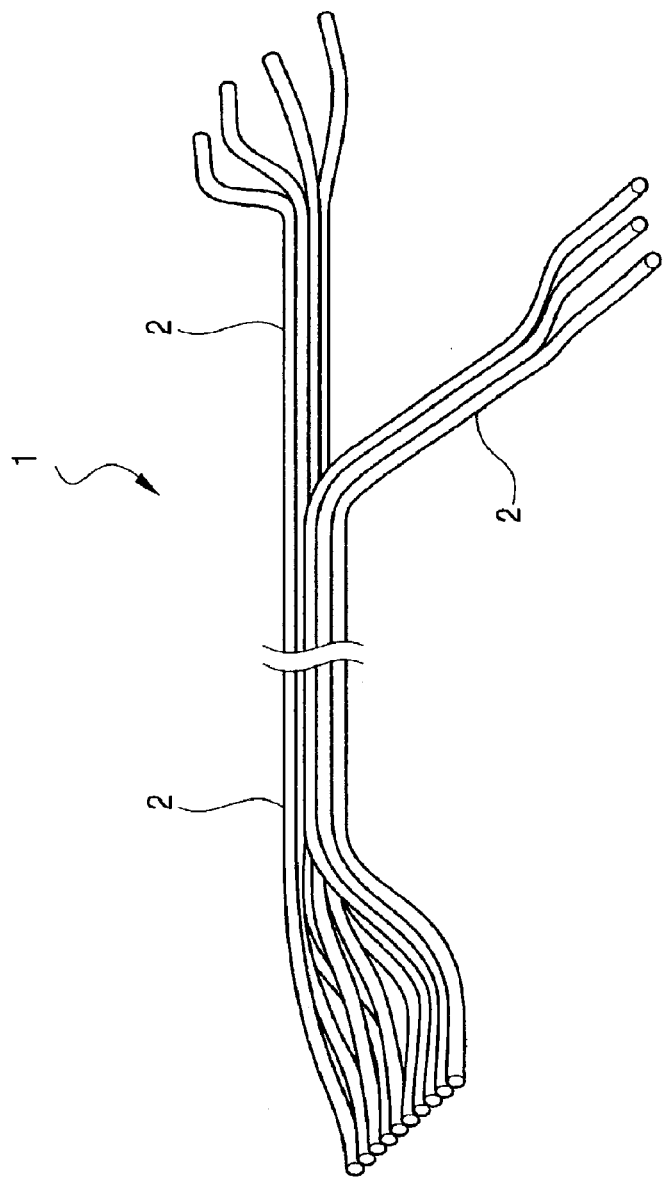
FIG. 2 is a perspective view showing a state of the wire harness after accompanied members are removed by a pre-process in a first recycling method.

As shown in FIG. 1, a wire harness 1 is constituted by a bundle of a plurality of electric wires 2. Further, terminals 3, connectors 4 and various kinds of boxes 5 such as junction boxes and fuse boxes are connected to the electric wires 2. A tape 6 and a tube 7 are wound on the electric wires 2 to thereby bind and protect the electric wires 2. Though not shown, other members such as grommets, wiring clips and protectors may be connected to the electric wires 2. These members (hereinafter referred to "accompanied members") accompanying the electric wires 2 are removed so that only the electric wires 2 are selected as shown in FIG. 2. Then the electric wires 2 are crushed. Incidentally, the wire harness 1 with the accompanied members may be crushed in this recycling method. In the case of crushing the electric wires 2 in which the accompanied members are removed, the accompanied members also can be reused.

Figure 3:
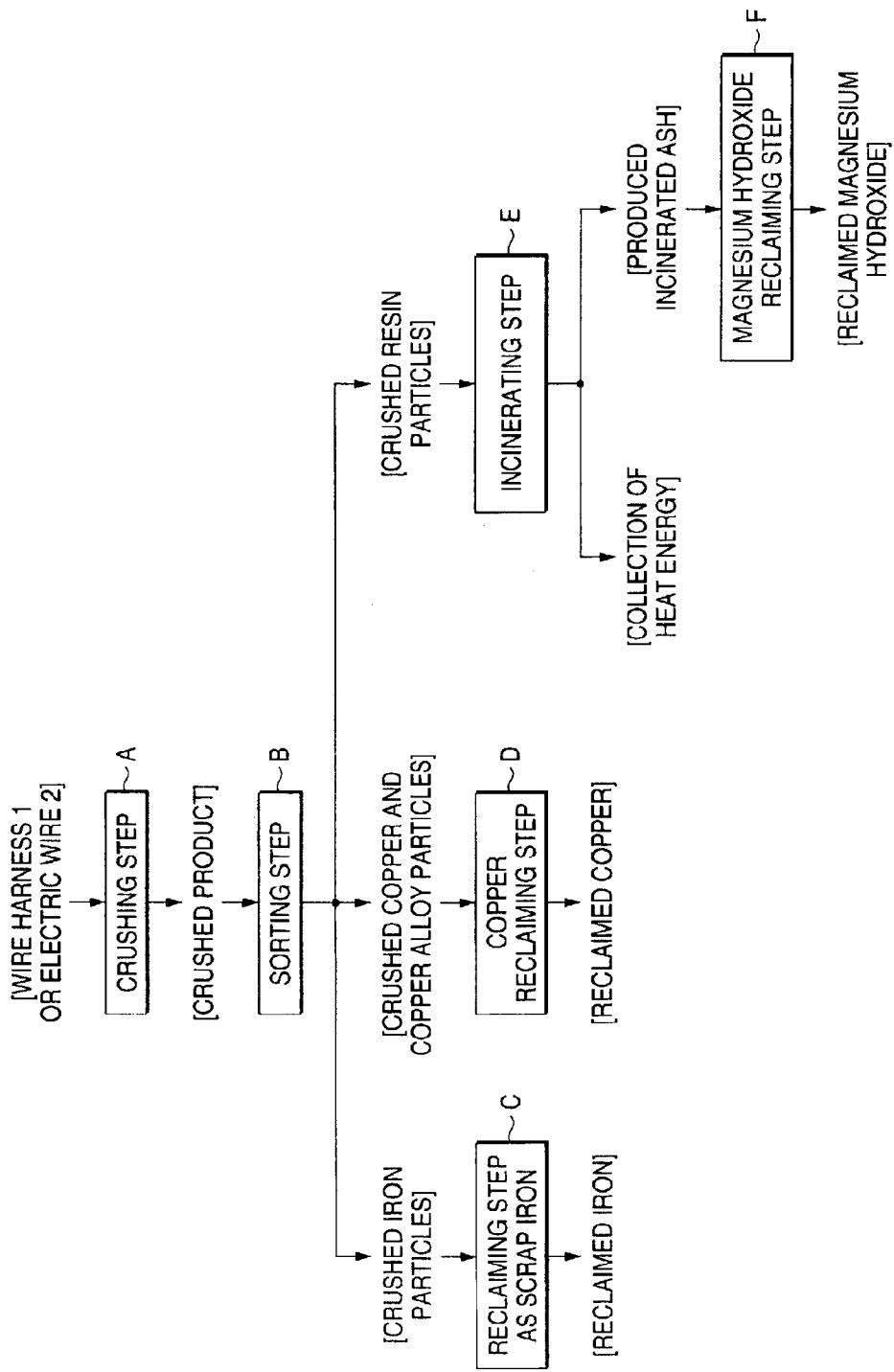
FIG. 3 is a flow chart showing the first recycling method.

After the pre-process, processing is performed according to a flow chart shown in FIG. 3. First, the wire harness 1 or the electric wires 2 are crushed in a crushing step A. A crushing method used in a general method for recycling a related-art vinyl chloride-coated wire harness can be used suitably as the crushing method in this crushing step A. The degree of crushation, that is, the particle size of the crushed particles of the crushed product can be set suitably in accordance with necessity.

Then, in a sorting step B, the crushed product obtained in the crushing step A is sorted into crushed metal particles constituting conductors, shields, etc. of the electric wires and crushed resin particles. Specifically, the crushed metal particles are further sorted into crushed ion particles and crushed copper and copper alloy particles. The crushed resin particles are comprised of a non-halogen fire retardant resin composition. A sorting method used in the general method for recycling a related-art vinyl chloride-coated wire harness can be used suitably as the sorting method in this sorting step B.

The crushed iron particles obtained by the sorting method in the sorting step B can be processed in the same manner as in the general method for recycling a related-art vinyl chloride-coated wire harness. For example, the crushed iron particles are generally delivered to a scrap trader and reclaimed as scrap iron in a reclaiming step C to produce reclaimed iron as occasion demands. A known scrap iron reclaiming method can be used suitably in this reclaiming step C as scrap iron.

The crushed copper and copper alloy particles obtained by the sorting in the sorting step B can be processed in the same manner as in the general method for recycling a related-art vinyl chloride-coated wire harness. For example, in a copper reclaiming step D, the crushed copper and copper alloy particles are melted and refined in a converter to obtain crude copper and then the crude copper is electric-smelted and collected as electrolytic copper.

On the other hand, the crushed resin particles obtained by the sorting in the sorting step B are incinerated in an incinerating step E. By the incineration, hydrocarbon constituting the coating material is vaporized, and magnesium hydroxide mixed as a fire retardant is oxidized to produce magnesium oxide contained in incinerated ash. Therefore, the incinerating step E is carried out at a temperature where at least hydrocarbon can be vaporized.

In addition, heat energy generated in the incineration can be collected. For example, there may be used a method in which steam generated by waste heat is used effectively.

Then, in a magnesium hydroxide reclaiming step F, magnesium oxide contained in the incinerated ash produced in the incinerating step E is converted into magnesium hydroxide and the magnesium hydroxide is collected. A known method for producing magnesium hydroxide from magnesium oxide can be used suitably for the conversion into magnesium hydroxide. For example, a method in which the incinerated ash is brought into contact with water may be used preferably and easily.

Incidentally, the wire harness 1 as a subject to be processed in the first recycling method is not particularly limited if the wire harness 1 is constituted by electric wires each coated with a resin composition containing an olefin-based resin and magnesium hydroxide mixed as a fire retardant with the olefin-based resin. For example, any wire harness 1 used as an electric wiring system in an apparatus such as a vehicle, a household electrical appliance, a business machine or an information machine or as an indoor or outdoor electric wiring system can be used as a subject to be processed. For example, in each of the electric wires 2 constituting the wire harness 1 used in a vehicle, an electrical insulator or a coating material is formed from a resin composition in which 50 to 200 parts by weight of magnesium hydroxide as a fire retardant are mixed with 100 parts by weight of polyolefin-based resin. Examples of the polyolefin-based resin include: poly-α-olefins such as low-density, intermediate-density or high-density polyethylene, polypropylene and polybutene; copolymer of the poly-α-olefins; ethylene-vinyl acetate copolymer; ethylene-ethyl acrylate copolymer; ethylene-propylene-diene elastomer. According to the first recycling method, magnesium hydroxide can be collected at a higher recovery rate than about 75%.

In the case of removing the accompanied members from the wire harness 1, a step of selectively taking resin products from the accompanied members removed from the electric wires 2, crushing the resin products to obtain crushed resin particles and mixing the crushed resin particles with a molding material to thereby newly form a molded article may be provided in the pre-process in the first recycling method. By the step, the waste wire harness can be reused more efficiently.

(Second Recycling Method)

Among the accompanied members accessory to the electric wires 2 constituting the wire harness 1, the connectors 4 and the boxes 5 are generally comprised of resin. Olefin-based resin such as polyethylene, polypropylene or polyethyl acetate is often used as the resin. Therefore, the second recycling method also reclaims these olefin-based resin accompanied members.

Figure 4:
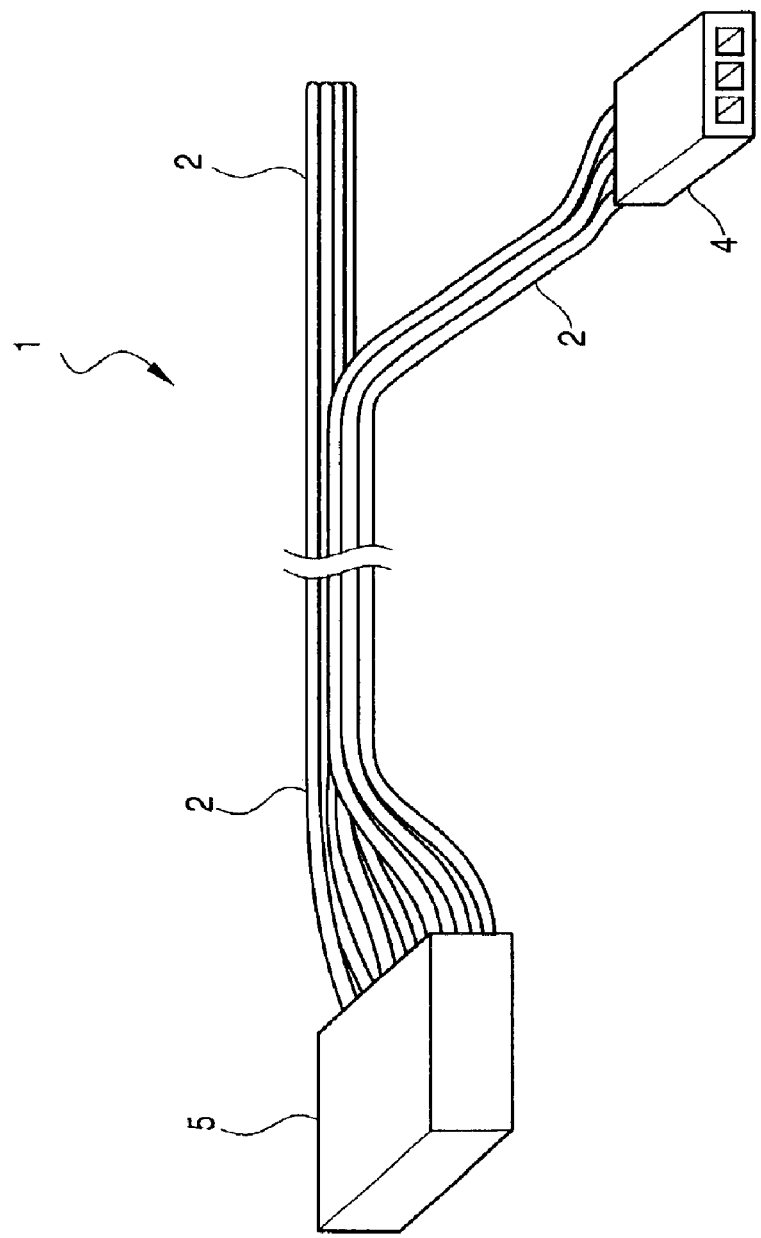
FIG. 4 is a perspective view showing a state of the wire harness after accompanied members except olefin-based resin members are removed by a pre-process in a second recycling method.

All accompanied members except olefin-based resin accompanied members among the accompanied members accessory to the electric wires 2 are removed from the electric wires 2 as a pre-process in the second recycling method. For example, FIG. 4 shows a state of the wire harness 1 of FIG. 1 after removal of the tape 6, the tube 7 and the terminals 3 as a pre-process on the assumption that the connectors 4 and the boxes 5 are comprised of olefin-based resin.

Figure 5:
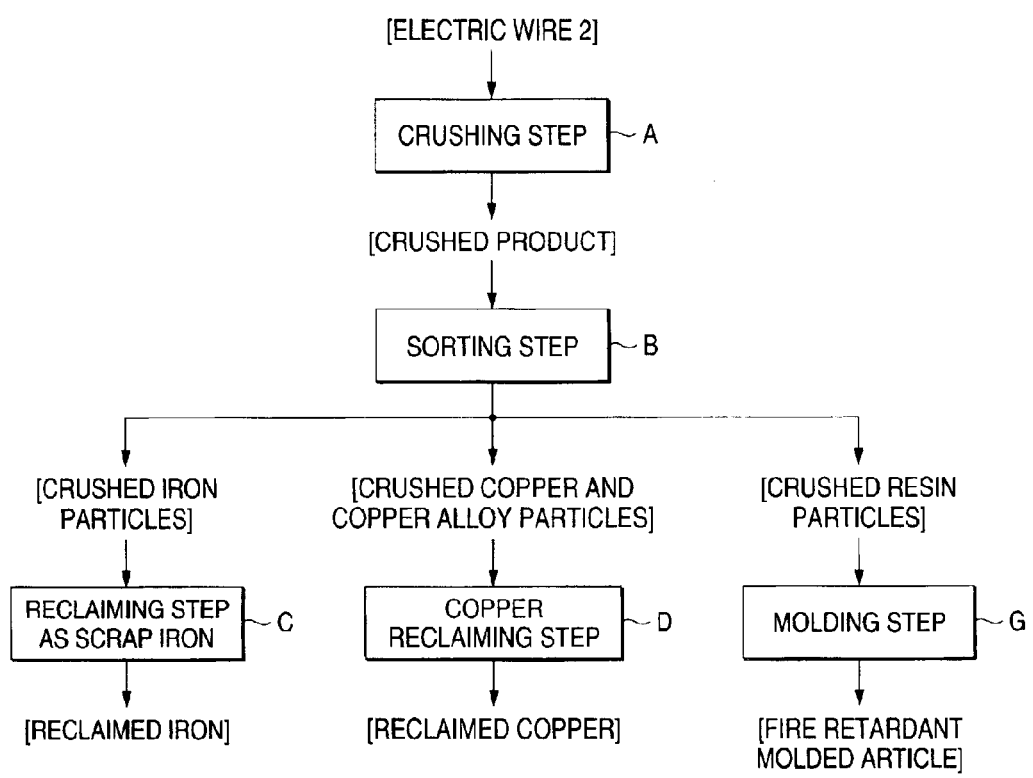
FIG. 5 is a flow chart showing the second recycling method.

After the pre-process, processing is performed according to a flow chart shown in FIG. 5. First, the electric wires 2 including the connectors 4 and the boxes 5 connected to the electric wires 2 are crushed in a crushing step A. The same crushing method as in the crushing step A of the first recycling method may be used. Then, the crushed product obtained in the crushing step A is sorted into crushed metal particles and crushed resin particles by a sorting step B. The same sorting method as in the sorting step B of the first recycling method may be used. Then, reclaimed iron and reclaimed copper are obtained from the crushed metal particles by a reclaiming step C as scrap iron and by a copper reclaiming step D. The two steps C and D may be the same as the reclaiming step C as scrap iron and the copper reclaiming step D in the first recycling method.

The crushed resin particles sorted in the sorting step B contain olefin-based resin, and magnesium hydroxide contained in the coating material. When the crushed resin particles are used as a molding material to be directly molded in a molding step G, a fire retardant molded article can be obtained. Further, as occasion demands, new olefin-based resin and magnesium hydroxide may be mixed with the crushed resin particles to thereby prepare a molding material. The fire retardant molded article may contain the coating material of the electric wires 2. Incidentally, the molding condition can be set suitably in accordance with the obtained molding material and the aimed fire retardant molded article.

The invention will be described below more specifically on the basis of embodiments thereof. The invention is however not limited to the embodiments.

(First Embodiment)

100 parts by weight of polyethylene were mixed with 100 parts by weight of magnesium hydroxide to prepare a resin composition. Electric wires each coated with the resin composition used as a coating material were produced. Then, the electric wires were crushed by a crusher to obtain a crushed product. The crushed product was sorted into crushed iron particles, crushed copper and copper alloy particles and crushed resin particles. The crushed iron particles and the crushed copper and copper alloy particles obtained were used as raw materials for reclaimed ion and reclaimed copper respectively.

On the other hand, the crushed resin particles obtained were incinerated in a high-temperature furnace at 850° C. to obtain incinerated ash. The incinerated ash was brought into contact with water to convert magnesium oxide into magnesium hydroxide. The magnesium hydroxide was collected. The recovery rate of the reclaimed magnesium hydroxide was equal to 78% by weight compared with the initial state.

(Second Embodiment)

A wire harness constituted by bound electric wires each containing a coating material of a non-halogen fire retardant resin composition was collected from a vehicle. Accompanied members accessory to the collected wire harness were examined. As a result, it was confirmed that the connectors and the junction boxes were comprised of polyolefin. Then, other accompanied members such as a tube, a binding tape and terminals than the polyolefin members were removed, so that the wire harness including the connectors and the junction boxes connected to the wire harness was put into a crusher. Then, the crushed particles obtained were sorted into crushed iron particles, crushed copper and copper alloy particles and crushed resin particles. The crushed resin particles were used for producing electric wires. The obtained electric wires had practically tolerant fire retardance and mechanical characteristic.

What is claimed is:

1. A method for recycling a waste wire harness including electric wires each coated with a resin comprised of an olefin-based resin and magnesium hydroxide as a fire retardant, and including accompanied members having at least one of terminals, connectors, various kind of boxes such as junction boxes and fuse boxes, grommets, wiring clips, and protectors which are connected to the electric wires, comprising the steps of:

crushing the waste wire harness to obtain crushed particles;

incinerating the crushed particles to produce incinerated ash;

converting a magnesium compound contained in the incinerated ash into magnesium hydroxide; and collecting the magnesium hydroxide.

2. The method for recycling a waste wire harness as set forth in claim 1, further comprising the step of sorting the crushed particles obtained in the crushing step into crushed metal particles and crushed resin particles so that only the crushed resin particles are incinerated in the incinerating step.

3. The method for recycling a waste wire harness as set forth in claim 2, further comprising the step of reclaiming and collecting metal from the crushed metal particles sorted in the sorting step.

4. The method for recycling a waste wire harness as set forth in claim 1, further comprising the step of removing the accompanied members from the waste wire harness before the crushing step.

5. The method for recycling a waste wire harness as set forth in claim 4, further comprising the steps of selectively taking resin parts from the accompanied members removed in the removing step;

crushing the resin parts to obtain crushed resin particles; and mixing the crushed resin particles with a molding material to obtain a molded article.

* * * * *